United States Patent [19]

Trcka

[11] 4,440,474
[45] Apr. 3, 1984

[54] ILLUMINATED PASSIVE DISPLAY FROM AN OBLIQUE ANGLE

[75] Inventor: James S. Trcka, Cedar Rapids, Iowa

[73] Assignee: Rockwell International Corporation, El Segundo, Calif.

[21] Appl. No.: 332,631

[22] Filed: Dec. 21, 1981

[51] Int. Cl.³ .................. G02F 1/133; F21V 9/14; F21V 5/00

[52] U.S. Cl. .................. 350/345; 362/19; 362/318

[58] Field of Search .......... 350/338, 345, 293, 296, 350/299, 378, 380, 399, 349, 337; 361/19, 21, 23, 26, 31, 318; 368/242

[56] References Cited

U.S. PATENT DOCUMENTS

| | | | |
|---|---|---|---|
| 3,864,022 | 2/1975 | Moriyama et al. | 350/349 |
| 4,124,279 | 11/1978 | Byles | 350/343 |
| 4,185,895 | 1/1980 | Stephens et al. | 350/345 |
| 4,195,915 | 4/1980 | Lichty et al. | 350/345 |
| 4,212,048 | 7/1980 | Castleberry | 350/345 X |

FOREIGN PATENT DOCUMENTS 472232 9/1937 United Kingdom ............... 350/399

Primary Examiner—John K. Corbin
Assistant Examiner—David Lewis
Attorney, Agent, or Firm—Terry M. Blackwood; George A. Montanye; H. Fredrick Hamann

[57] ABSTRACT

A non-light-emitting (passive) display such as a dichroic LCD is frontally illuminated with polarized light incident obliquely upon the display, the incident light having followed multiple paths to arrive at the display from multiple directions. Relative to a typical display viewing axis, some light arrives from one side of such axis and some light arrives from the other side of such axis. An appropriately positioned light emitter, preferably comprising a reflective cavity, lamp, and polarizer, casts some light directly on the display, and casts other light, which is also substantially collimated, on an appropriately positioned reflector which re-directs incident light to the display.

15 Claims, 5 Drawing Figures

4,440,474

ILLUMINATED PASSIVE DISPLAY FROM AN OBLIQUE ANGLE

This invention relates to non-emitting or passive displays and to illumination thereof, and in the preferred application, to illuminating dichroic LCDs for use in low ambient light conditions such as would occur at night.

Liquid crystal displays (LCDs) are passive displays which modulate incident ambient light. One particular type of LCD, phase transition pleochroic dye LCD, also commonly referred to as a dichroic LCD, functions on the principle of light absorption to provide contrast between display elements and the display background. The display cell is constructed by known techniques and it is filled with a liquid crystal host material in which is dissolved a guest dichroic dye. Additives blended to the host material result in a spiral orientation of the crystals across the cell spacing. The dye molecules tend to align with the host material. Treatment of the glass substrates further result in a parallel alignment of the crystals with the substrate surfaces. Thus, each plane of crystals remains parallel to the substrate but the longitudinal axes of the crystal in one plane are slightly angled to crystals in an adjacent plane resulting in a spiral alignment across the cell spacing. In this orientation, the dye molecules are absorptive. If a field is applied across the display, the host material and dye molecules will rotate and align in a perpendicular (homeotropic) orientation in which case the dye is much less absorptive.

Because an activated area is much less absorptive than an inactive area, much more light passes through the active areas and becomes incident on the reflector. This results in a lighter area contrasted against a darker area. Depending on the spectral absorption characteristics of the media encountered along the light path (e.g., dye, reflectors, etc.), display elements of a given color can be provided which contrast against a complimentary color. White characters on a black background are colors which can also be provided.

For use under low ambient light conditions such as night time, it is necessary to provide a means of illumination for passive displays such as the aforedescribed liquid crystal display. Moreover, it is quite often desirable for the illumination means and display to be space efficient and for the display to have good brightness and contrast. In accordance with the present invention, a display is illuminated by polarized light which originates from a location well out of the viewing range and which is incident on the display at a plurality of angles, such polarized light arriving obliquely at the display from both below and above a typical axis of display viewing thereby producing good brightness, brightness uniformity, and contrast ratio of the display.

These and other features, objects, and advantages of the invention will become more apparent upon reference to the following specification, claims, and appended drawings in which:

Figure 1:
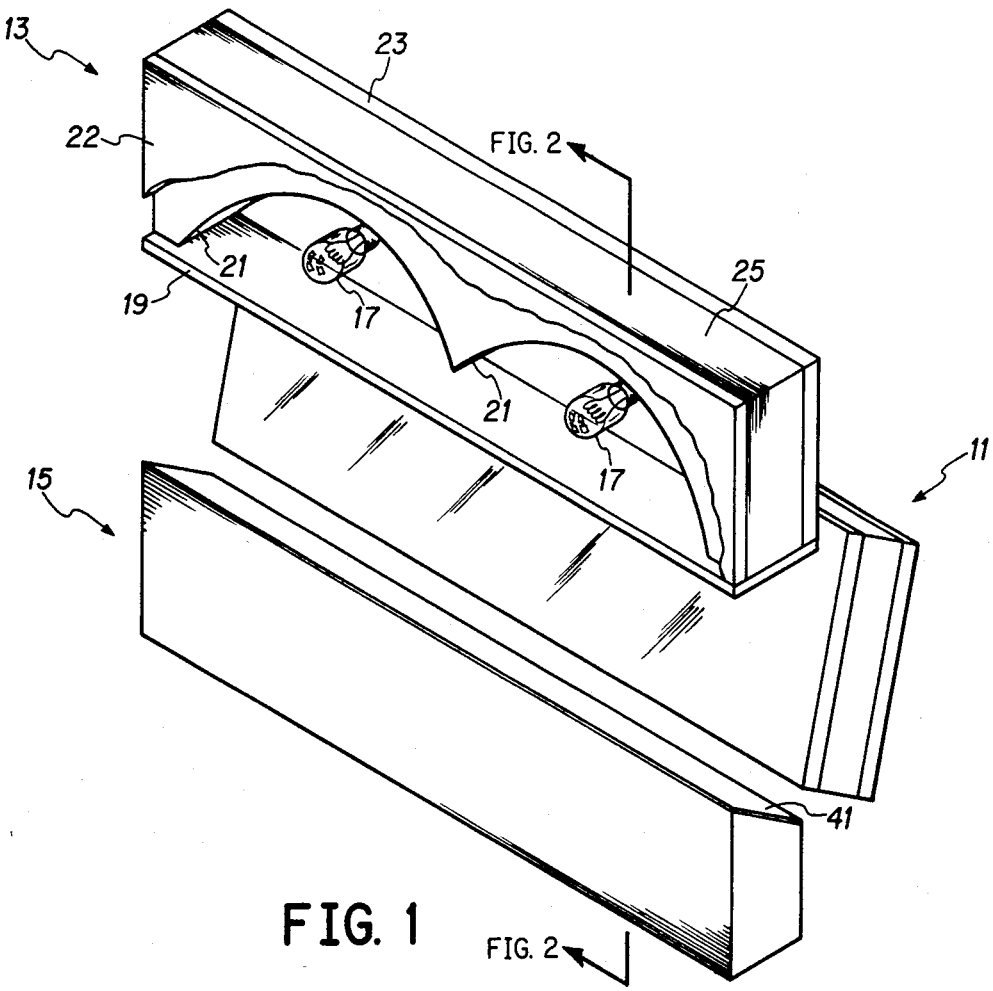
FIG. 1 is a perspective view representing the presently preferred inventive embodiment.
Figure 2:
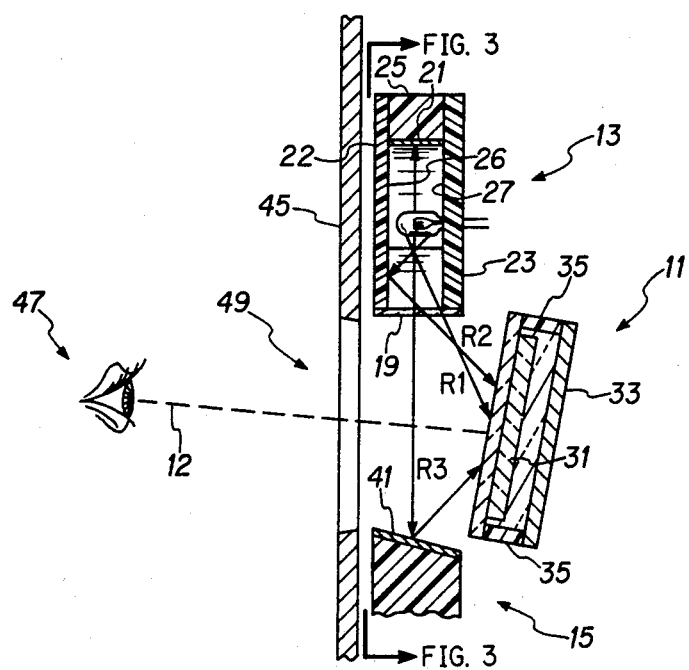
FIG. 2 is a side cross-sectional view of the FIG. 1 illustrated apparatus and indicates typical placement of the apparatus behind a viewing aperture.
Figure 3:
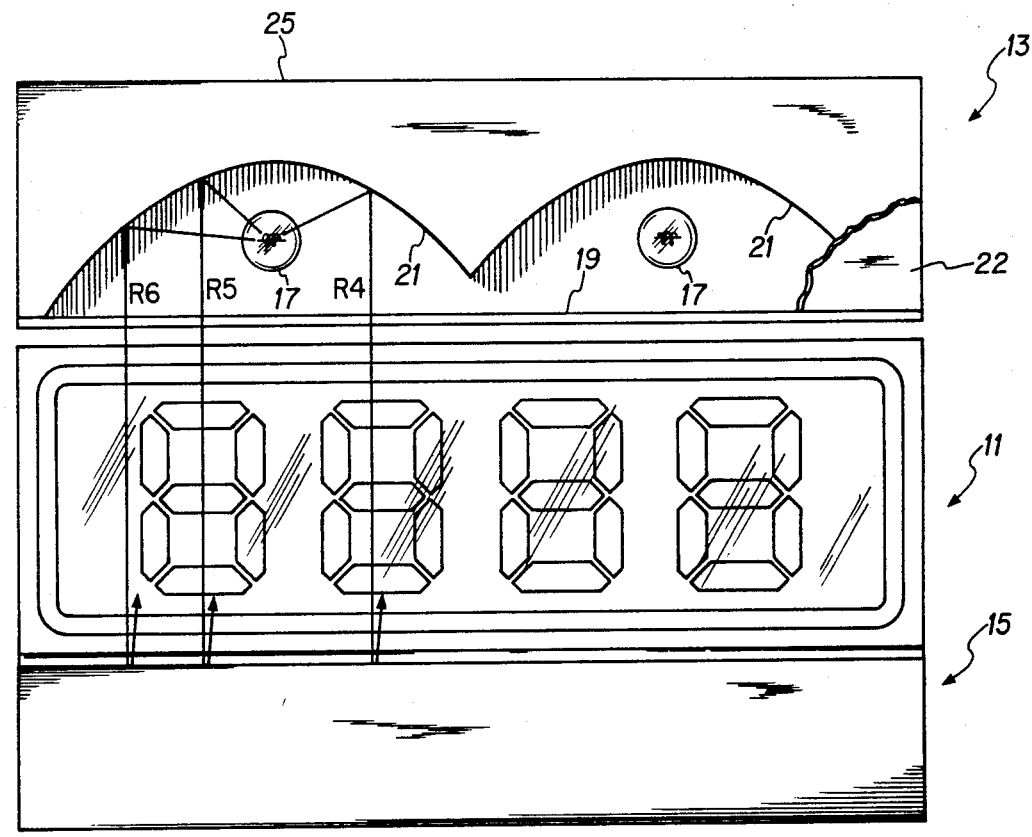
FIG. 3 is a front view taken along the line of FIG. 2 labeled FIG. 3.

Referring now to FIGS. 1, 2, and 3, a display 11 is front lighted by polarized light arriving from both above and below a typical axis of viewing 12. The light from above is provided by polarized-light emitter assembly 13 casting polarized light directly onto display 11. The light from below is provided by emitter 13 casting polarized and collimated light onto reflector 15 which re-directs the incident light to display 11.

Emitter 13 comprises one or more reflective cavities housing a like number of incandescent lamps 17, and further includes a transparent, light polarizing member 19 located at the light exit of emitter 13. Each cavity is formed to have a parabolic back surface 21 and two flat side surfaces 26 and 27. In the present embodiment, surface 21 obeys a parabolic curve only in planes parallel to that of the FIG. 3 illustration. Although surface 21 is thus not, in the present implementation, a section of a paraboloid of revolution, it could be made so.

The cavities are typically formed from a plastic block 25 having one edge cut or otherwise shaped according to parabolic troughs, and also from two flat and enclosing side wall members 22 and 23 attached to block 25. Each parabolic trough is preferably coated with specularly reflective material so that each parabolic back surface 21 is specularly reflective. The side wall surfaces 26 and 27 are substantially parallel with one another and are each diffusely reflective. Wall 23 is an electrically insulating material and includes an opening through which a lamp 17 and its leads may be passed. Each lamp 17 is located at the focal point of the associated parabola. Polarizing filter 19, located at the light exit, is oriented so that the transmission axis is perpendicular to the FIG. 2 plane of illustration. Presently employed for polarizing filter 19 is a transparent polarizing material Type No. NPF Q-10 or NPF Q-12 available from Nitto Denko America, Inc.

Display assembly 11 comprises a conventional reflective dichroic liquid crystal display 31 mounted to a printed circuit board 33. Electrical contact is made through elastomeric type connectors 35.

Reflector 15 has a flat, rectangular, specularly reflective surface 41 which extends substantially the same length as polarizer 19. Reflective surface 41 is tilted back toward display 11 so as to properly re-direct incident light to display 11. The narrow dimension of surface 41 is chosen to intercept a substantial portion of the rays coming thereto from the parabolic surface 21.

Turning now specifically to FIG. 2, therein is represented a typical arrangement of items 11, 13, and 15 relative to one another, and relative to a panel 45, to a viewer or observer 47, and to a panel aperture or window 49. Both items 13 and 15 are located toward the front of item 11 but also toward opposite sides of item 11 and therefore do not substantially interfere with observation of display 11. Items 11, 13, and 15 are mechanically connected to one another by means not illustrated and so that their relationship to one another is fixed. To achieve space efficiency in the preferred embodiment, the display 11 is positioned in close proximity to emitter 13 and reflector 15, and is also tilted at a small angle relative to the plane of the viewing aperture.

In operation, light reaches display 11 by various routes and from a plurality of directions and incident angles. For example, some of the light reaching display 11 arrives from above either directly from a lamp 17 (as indicated by ray R1 in FIG. 2) or indirectly from a lamp 17 after one or more reflections from the cavity side walls (as indicated by ray R2 in FIG. 2). Light also reaches display 11 from below as a result of the parabolic reflector re-directing light from a lamp 17 toward the flat reflective surface of reflector 15 which then re-directs the incident light upward to display 11. (See ray R3 in FIG. 2.) Moreover, the parabolic reflector 21 has a converging effect on the rays it receives and reflects, such converging effect being such that there is substantial collimation of the light rays directed toward reflector surface 41. Such collimizing is illustrated by rays R4, R5, and R6 in FIG. 3.

All light rays directed to the display must pass through polarizing filter 19 where the light is plane polarized. Polarizing filter 19 is so oriented that electric field vectors whose direction is perpendicular to the plane of the FIG. 3 illustration are not permitted to pass. The electric field vectors whose direction is parallel with the plane of the FIG. 3 illustration are permitted to pass. The effect of this polarization is enhanced contrast of the display. This enhancement is due to the selective absorption characteristics of the dye in the unactivated areas of the display and to higher transmissivity, in the activated areas of the display, of the electric field vectors which are parallel to the face of the display. Further details of the rationale are provided in U.S. Pat. No. 4,212,048.

Additionally, the parabolic reflector 21 and polarizer 19 cooperate to further enhance the displays due to the amount of preferred-polarized light arriving at display 11 front surface. Further explanation of enhancing the amount of light having preferred polarization is made with the aid of FIG. 5 which shows, in perspective, a polarizer 19 from the same aspect as illustrated in FIG. 1, and also shows three light rays impinging thereon at different angles. An X-Y-Z coordinate system is assigned to the FIG. 5 illustration such that the Z axis is perpendicular to polarizer 19, the X axis is perpendicular to the Z axis and is parallel to the transmission axis of polarizer 19, and the Y axis is perpendicular to both the X and Z axes.

Figure 5:
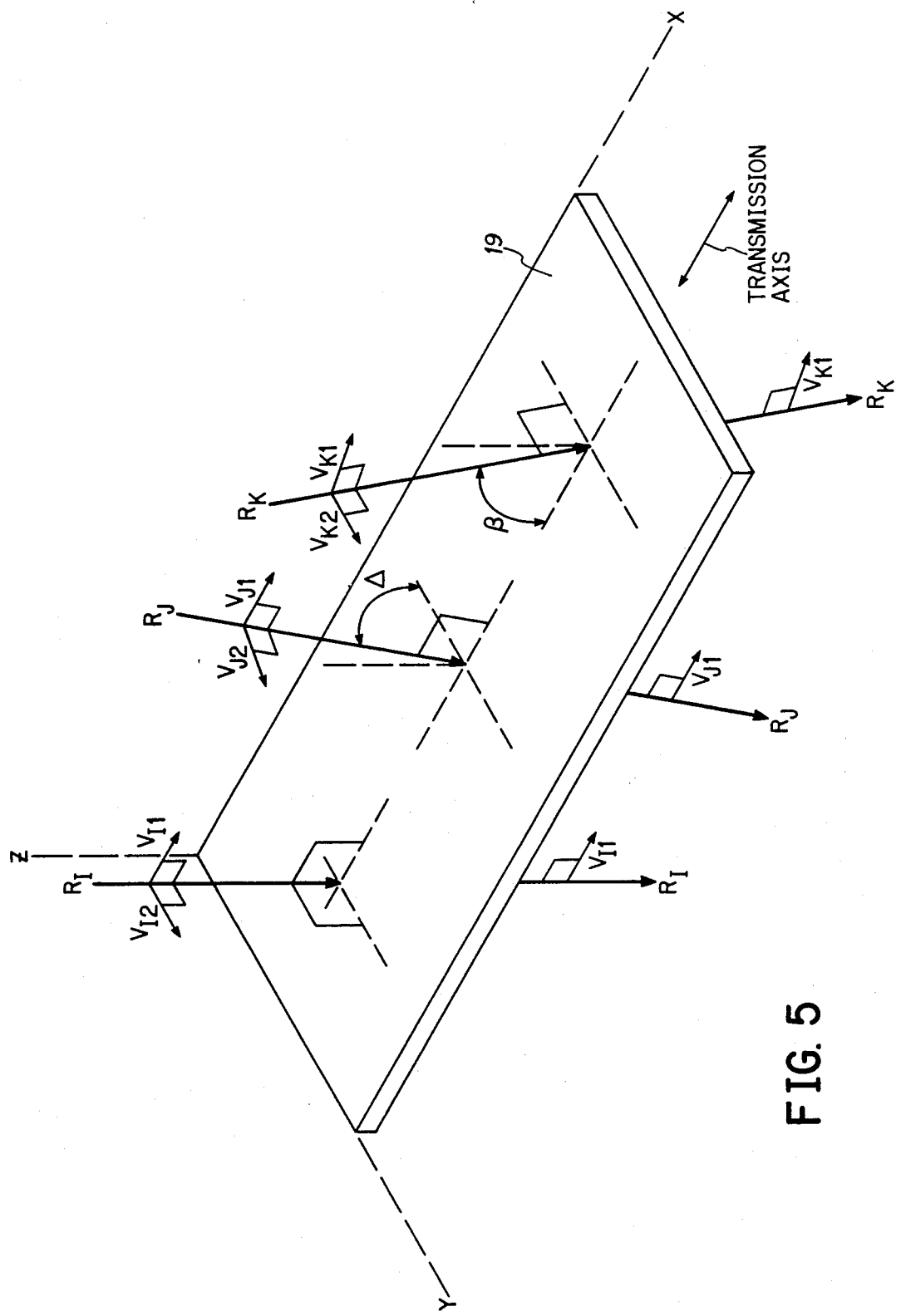
FIG. 5 is a perspective view representing light rays and a polarizer, and is useful in explaining the operation of the inventive embodiments.

Referring now to a ray such as $R_I$ in FIG. 5, $R_I$ has orthogonal electric field vectors $V_{I1}$ and $V_{I2}$ which are also orthogonal to $R_I$. $V_{I1}$ is aligned so as to be parallel with the transmission axis of polarizer 19 and thus passes through polarizer 19. $V_{I2}$ is oriented perpendicularly to the transmission axis of polarizer 19 and is thus eliminated by polarizer 19. Upon arrival of the polarizer-passed ray $R_I$ at the display surface, whether directly or by reflection from a reflector such as 15 in FIG. 1, vector $V_{I1}$ will be parallel to the display front surface and will thus have the preferred orientation.

A ray such a $R_J$ in FIG. 5 is similar to ray $R_I$ except the $R_J$ is tilted or rotated an angle $\Delta$ about an axis parallel to the X axis while still lying in a plane parallel to the Y-Z plane. Vector $V_{J1}$ is passed by the polarizer and vector $V_{J2}$ is eliminated. Vectors $V_{J1}$ and $V_{I1}$ are oriented parallel with one another, and upon arrival of polarizer-passed ray $R_J$ at the display surface, whether directly or by reflection from a reflector such as 15 in FIG. 1, vector $V_{J1}$ will be parallel to the display front surface and thus will have the preferred orientation.

A ray such as $R_K$ is similar to rays $R_I$ and $R_J$ except that $R_K$ is tilted or rotated an angle $\beta$ about an axis paralled to the Y axis while still lying in a plane parallel to the X-Z plane. Vector $V_{K1}$ is passed by the polarizer 19 and vector $V_{K2}$ is eliminated. Upon arrival of the polarizer-passed ray $R_K$ at the display surface, whether directly or by reflection from a reflector such as 15 in FIG. 1, vector $V_{K1}$ will have a component which is not parallel to the display front surface. The non-parallel vector can be further resolved into components, one of which will be parallel to the surface of the display and the other perpendicular. The perpendicular component is considered non-preferred. For rays such as $R_K$ whose angle of incidence $\beta$ deviates from 90° only a small to moderate amount, the resolved electric field vectors will have a larger component in the preferred orientation and thus such rays will still add to enhancement.

It is believed that a favorable percentage of light rays in the preferred embodiment are similar to rays $R_I$ and $R_J$ in FIG. 5 and that this results in an enhanced contrast of the display.

To summarize, in the preferred embodiment, a means is provided for collimating the light which results in not only imporved efficiency but also results in the polarized rays becoming incident upon the display in a preferred orientation, namely, the electric field vector being parallel to the face of the display.

The above described features cooperate to produce enhancements in brightness, brightness uniformity, and contrast. Other details of the presently preferred implementation are as follows. The display assembly 11 is positioned so as to be tilted at about 5° to 8° relative to a plane containing collimated rays; i.e., relative to vertical in the FIG. 2 illustration. Display 11 is set back from items 13 and 15 so that the bottom part of the area of displayed indicia is approximately 0.2 inches behing the frontmost edge of surface 41. The angle of flat reflective surface 41 is about 85° relative to vertical in FIG. 2.

Figure 4:
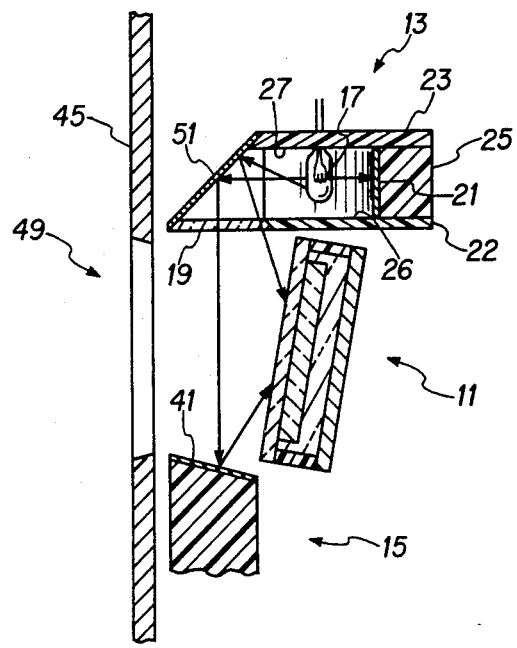
FIG. 4 is a side cross-sectional view representing an alternative embodiment of the invention.

FIG. 4 represents an alternative embodiment which, with one exception, is substantially the same as the FIGS. 1, 2, and 3 embodiment. Since there are many similarities, like-reference designators are used for like elements. The exception is that an additional flat reflector 51 is included in emitter 13 so as to permit emitter 13 to be oriented orthogonally to the orientation shown in FIG. 2, thereby reducing vertical space requirements. Added reflector 51 re-directs light internal to emitter 13 so that after light exits the polarizer 19, there is no substantial functional distinction between the FIG. 2 embodiment and the FIG. 4 embodiment.

Thus, while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:
1. Display apparatus comprising a reflective dichroic liquid crystal display first means to be illuminated and viewed by an observer,
   light emitting second means, and
   reflector third means,
      said second and third means both being located toward the front of said first means and also toward opposite sides of said first means so that neither said second or third means substantially interferes with frontal viewing of said first means by the observer,
      said second means comprising a light directing means for directing plane polarized light toward said first means and another light directing means for emit- ting plane polarized, substantially collimated light toward said third means, said second means including a light source and a fourth means for effecting a decrease in light ray divergence, said third means being located and configured so as to re-direct the polarized collimated light impinging thereon from said second means on toward said first means, said redirected light also being plane polarized and substantially collimated, said first means having a substantially flat front face arranged relative to said second and third means such that said first means face is frontally illuminated (i) by second means emitted polarized light arriving obliquely from said second means and (ii) by said re-directed light arriving obliquely from said third means, and the orientation of polarization being such that the light rays arriving at said face from both the second and third means have their electric vectors oriented substantially parallel to said face.

2. Apparatus as defined in claim 1 wherein said fourth means comprises means for reflecting light.

3. Apparatus as defined in claim 2 wherein said second means has a light exit and includes, at said light exit, polarizer means for effecting plane polarization of light.

4. Apparatus as defined in claim 3 wherein said fourth means is configured such that at least one predetermined cross-section thereof conforms substantially to a parabola.

5. Apparatus as defined in claim 4 wherein said parabola has a focus point, and said light source is located substantially at said focus point.

6. Apparatus as defined in claim 5 wherein said fourth means is specularly reflective.

7. Apparatus as defined in claim 6 wherein said second means includes walls forming, in conjunction with said fourth means, a cavity in which said source is housed.

8. Apparatus as defined in claim 7 wherein said walls have interior surfaces which are reflective.

9. Apparatus as defined in claim 8 wherein said reflective interior surfaces are substantially flat and are diffusely reflective.

10. Apparatus as defined in claim 9 wherein said reflective interior surfaces are two in number and are substantially parallel with one another.

11. Apparatus as defined in claims 1, 2, 3, 4, 5, 6, 7, 8, 9, or 10 wherein said second means further includes a reflective fifth means for re-directing light from said source and from said fourth means prior to such light leaving said second means, whereby, alternative positioning of said source and said fourth means can be effected.

12. Apparatus as defined in claims 1, 2, 3, 4, 5, 6, 7, 8, 9, or 10 wherein said third means is substantially flat and specularly reflective.

13. Display apparatus comprising:

first means for providing a light beam comprising plane polarized light rays which are substantially collimated, said collimated polarized light rays having electric field vectors, and the orientation of polarization being such that the electric field vectors of said polarized rays are parallel to a first predetermined plane which itself is perpendicular to a second predetermined plane, display second means for being illuminated by the collimated polarized rays of said first means, said second means comprising a reflective dichroic liquid crystal display having a substantially flat front face and being oriented (i) such that said face is substantially perpendicular to said second plane, the collimated polarized light rays reaching said second means thereby having their electric field vectors oriented substantially parallel to said second means front face, and (ii) such that the collimated polarized light rays reaching said second means are directed by said first means to arrive obliquely relative to the front face.

14. Apparatus as defined in claim 13 wherein said first means comprises a light source, a parabolic reflector for collimating light rays from the light source, and a polarizer for plane polarizing the collimated light rays.

15. Apparatus as defined in claim 14 wherein said first means includes a substantially flat specular reflector for causing the collimated polarized light rays from said polarizer to be directed toward said second means.

* * * * *